Aug. 3, 1948.  U. EKBLOM  2,446,173
AUTOMATIC ELECTRIC PILOT
Filed Sept. 19, 1944  4 Sheets-Sheet 1

Uno Ekblom
INVENTOR:
BY C. F. Wm. Forssberg

Aug. 3, 1948.    U. EKBLOM    2,446,173
AUTOMATIC ELECTRIC PILOT
Filed Sept. 19, 1944    4 Sheets-Sheet 2

Uno Ekblom
INVENTOR:
BY C. F. Wm Forssberg

Aug. 3, 1948.    U. EKBLOM    2,446,173
AUTOMATIC ELECTRIC PILOT
Filed Sept. 19, 1944    4 Sheets-Sheet 3

Uno Ekblom
INVENTOR:

E. F. Hem Forssberg
BY    ATTORNEY.

Aug. 3, 1948.                U. EKBLOM                2,446,173
                      AUTOMATIC ELECTRIC PILOT
Filed Sept. 19, 1944                          4 Sheets-Sheet 4

Uno Ekblom
INVENTOR:
BY C. F. Wm Forssberg
ATTORNEY.

Patented Aug. 3, 1948

2,446,173

UNITED STATES PATENT OFFICE 2,446,173

AUTOMATIC ELECTRIC PILOT

Uno Ekblom, Brooklyn, N. Y.

Application September 19, 1944, Serial No. 554,838

9 Claims. (Cl. 318—489)

This invention relates to automatic or self-correcting pilots and steering mechanisms for ships, boats and other craft, which may be set to a given course, after which the apparatus will automatically hold the ship to the course thus set.

The main object of my invention is to provide automatic apparatus for operating a ship's rudder and holding the ship on a set course by periodically correcting and counteracting any deviations from the course to be followed by the ship.

Another object is to utilize sensitive and responsive electric devices in an automatic pilot for promptly correcting all deviations from the predetermined course on the part of the ship involved in order to provide accurate steering of said ship.

A further object is to produce an automatic pilot of the type indicated which is capable of attending to the steering of the ship equipped therewith for long periods of time in order to free the helmsman for other service or for rest, as desired.

It is also an important object to provide such an automatic pilot which is adjustable for smooth or stormy seas, powerful and certain in operation, and so simple in construction and principle as to be well within the reach of the average ship owner economically and readily understood and used by him.

An additional object is to have such a sound and effective principle forming the basis of the invention that the automatic pilot embodying the latter may have certain portions of the apparatus capable of being replaced by other devices, according to conditions.

Other objects and the advantages of my invention will appear more fully in detail as the specification proceeds, when taken in conjunction with the accompanying drawings, in which.

In the field of marine navigation, the largest ships are usually equipped with quite elaborate and costly apparatus for automatically steering said ships more or less satisfactorily, but the expense involved limits the installation of such equipment to large and expensive ships. The majority of smaller ships, yachts and boats are thus necessarily steered by hand, unavoidably requiring constant attention at all times at the tiller and constantly wasting the services of one hand on board the ship who could otherwise attend to various duties during a voyage.

The present invention is designed to be installed on smaller boats and ships and to be economical in cost and actual use, a common storage battery or other source of moderate or low electric current sufficing to operate the apparatus. In addition, the apparatus involved is compact, simple to set, and provided with such a comprehensive group of adjustments that perfect control is obtained at all times with only occasional attention by the helmsman being required.

Hence, returning again to the drawings, the invention comprises a group of interconnected devices, for convenience mounted within and upon a casing generally indicated at 21 (Figs. 1, 2 and 3), a compass 22 of the magnetic or gyroscope type being mounted in the top portion 23 of said casing and surmounted by a compass follower device 24 at one side, while a rudder control device generally indicated at 25 is spaced a small distance from the compass follower. On the near side is the tiller 26 for steering by hand upon occasion, while an electric motor 27 by its pulley 28 drives the larger pulley 29 through a belt 30 and thus rotates shaft 31 and by means of the latter provides the apparatus with power. From the apparatus extends the steering shaft 32 to which is fixed a lever 33 connected pivotally by a link 34 to the rudder lever 35 rigid with the rudder 36 pivotally mounted in rear bearing 37 of the ship. Link 34 is provided with a resilient shock absorber within sheath 38 which may be of the spring or hydraulic type to prevent violent blows from high seas against the rudder from being transmitted to the tiller and the steering mechanism.

If it is desired to use other means than levers and links to connect steering shaft 32 with the rudder, the latter may have a pulley (not shown) secured thereon and connected by a belt, chain or metal rope or band with pulley 39 on said shaft 32.

An on and off switch 40 is provided for cutting out electrical or automatic operation, at will, while on the other hand, the buttons 41, 42 and 43 in the top 23 of casing 21 serve for controlling the steering electrically without the use of the tiller or automatic operation. Button 41 controls operation of the rudder to steer the ship to port and button 43 controls operation of the rudder to steer the ship to starboard, while the center button 42 serves to stop operation in either direction and conditions the apparatus for further steering by buttons 41 and 43, as will be further explained. Motor 27 is connected to the apparatus by a four-conductor cable 44 and is preferably at a reasonable distance from the compass 22 and compass follower 24 to avoid any disturbance of the same which might cause errors in operation and steering.

Figures 1, 10, 15:
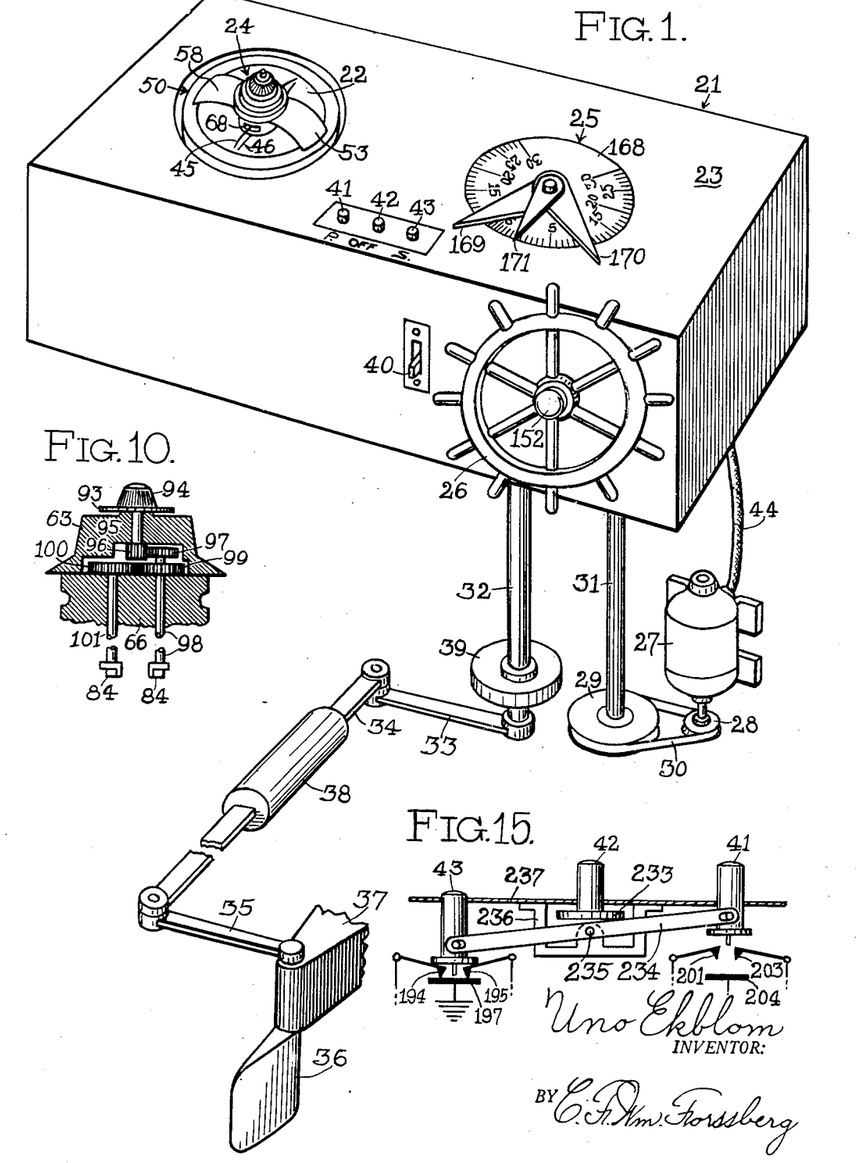
Fig. 1 is a perspective and partially diagrammatic view of an apparatus forming an automatic pilot installed on a ship and embodying the invention in practical form, only a portion of said ship being shown.
Fig. 10 is a fragmentary vertical section of the main control members of Figs. 8 and 9.
Fig. 15 is an enlarged fragmentary section, partly in diagrammatic form of the control buttons of Figs. 1 and 13.

While the immediate control of the operation and position of the rudder are effected by the rudder control mechanism 25, more fully shown in Figs. 2–7, as will be discussed in detail, the ultimate control resides in the compass follower device 24 which has a pivotally mounted needle 45 adapted to overlie and follow the movements of the compass needle or magnetic member 46 as shown in Fig. 1. It will thus be in order first to consider this portion of the apparatus.

Figures 9, 11, 12:
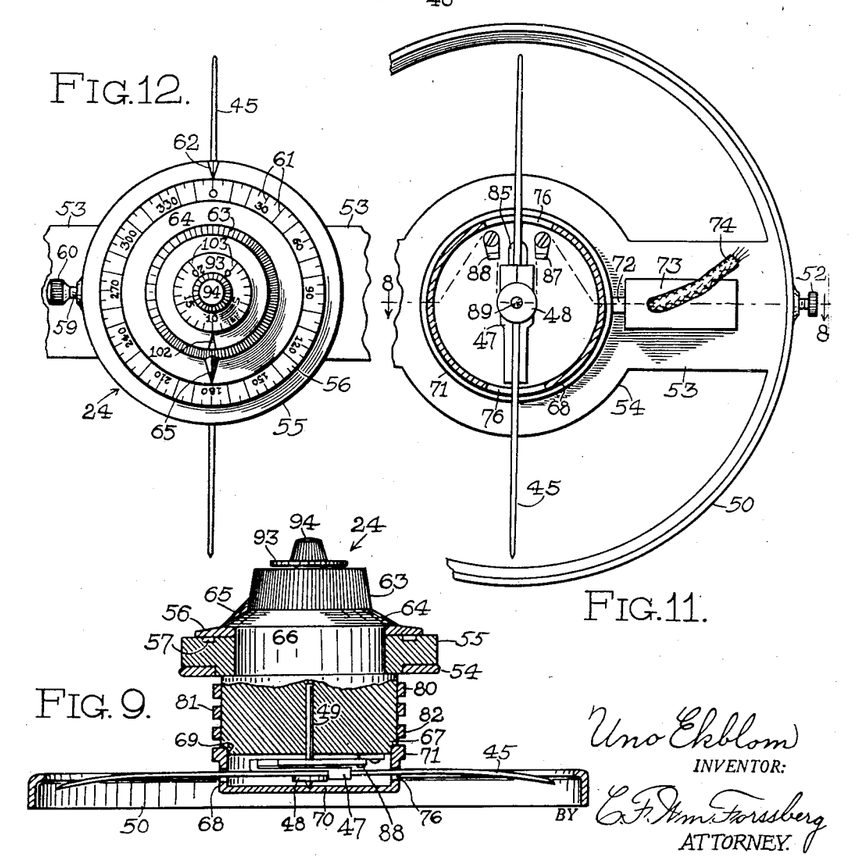
Fig. 9 is another section of the same mechanism taken at right angles to the section plane of Fig. 8.
Fig. 11 is a bottom plan view of the mechanism of Figs. 8 and 9, a portion being torn away for reducing the size of the view, and clarify details.
Fig. 12 is an obverse view of the same mechanism with peripheral frame parts broken away.

The mentioned needle 45 is actually a switch contact member as may be seen in Figs. 8, 9 and 11 to 14, inclusive. Needle 45 is fixed in a needle body 47 of metal provided with a pivot disk 48 and a pivot pin 49 pointed at the bottom and extending rigidly through both members 47 and 48 (Figs. 8, 9 and 11), of which more will be stated later. The unit under discussion primarily includes a frame 50 adapted to fit upon a compass casing 51 (Fig. 2) and be held in place thereon by a set screw 52. Two or more support members 53 extend upwardly and inwardly from frame 50 and join to form a supporting ring 54 for annular fixed member 55 upon which a rotary ring dial 56 is mounted, having a row of rack teeth 57 upon its lower surface. A pinion 58 meshes with said rack teeth, being fixed on a shaft 59 rotatably mounted in member 55 and exteriorly provided with a manual knob 60 by which the shaft and pinion may be rotated in order to rotate said ring dial for a purpose to be noted hereinafter. Upon the ring dial just described is a series of indicia 61 subdividing the entire perimeter thereof into 360° while upon member 54 is a stationary index mark 62 cooperating with said indicia (Fig. 12).

Figure 13:
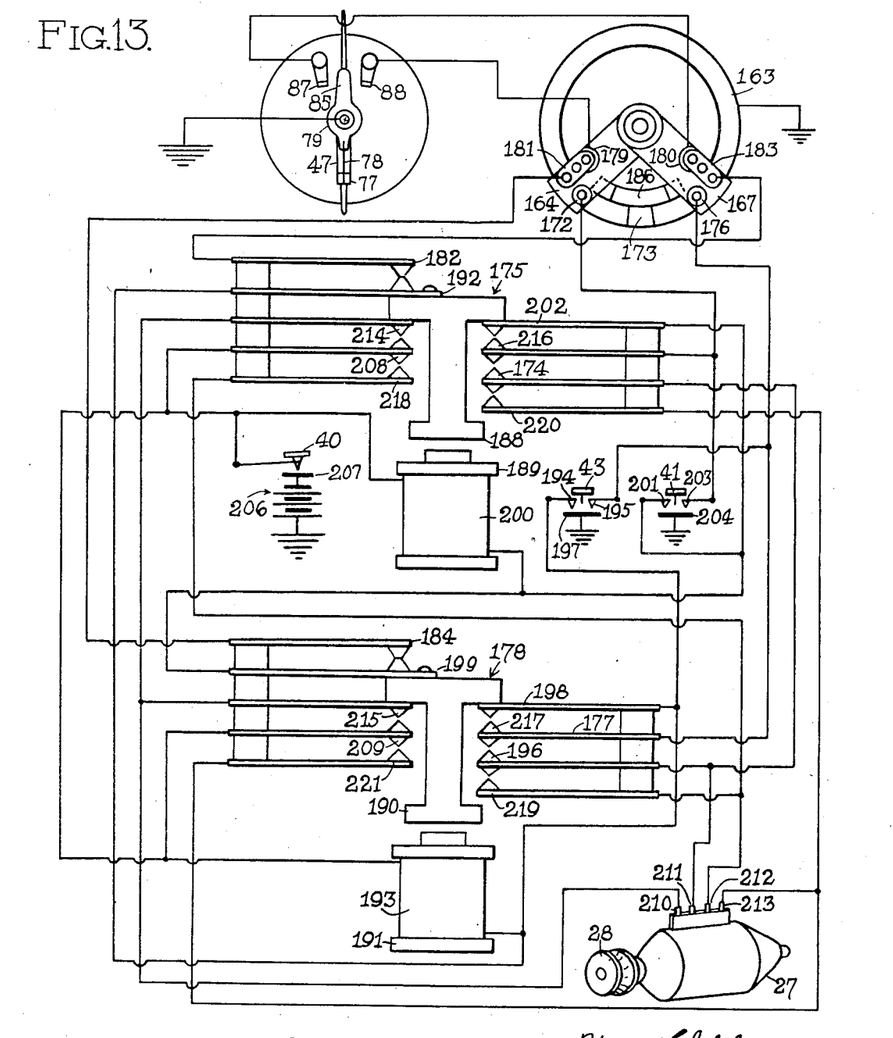
Fig. 13 is a circuit diagram including the electrical system of the entire apparatus of Fig. 1, in open circuit.
Figure 14:
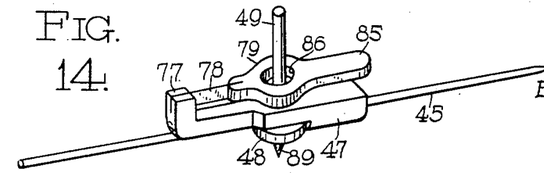
Fig. 14 is an enlarged perspective view of a pivoted contact needle member of Fig. 13.

A knob 63 having a flange 64 and an index projection 65 also cooperating with the indicia 61 on the ring dial 56 has a generally cylindrical portion 66 rotatable within annular member 54, and to the lower end of said cylindrical portion is secured a cylindrical insulating body 67 by means of screws or bolts (not shown), so as to be rotated by the mentioned knob 63. The body 67 has a metal bearing cup 68 fitted tightly into the lower recess 69 thereon and the bottom 70 of the cup forms a bearing for the lower pointed end of the pivot pin of follower needle 45 already referred to, the upper edge 71 of the cup forming a contact ring for a brush 72 supported in an insulating block 73 and connected through cable 74 to ground or the frame of the apparatus, while a spring 75 urges the brush into intimate contact with said contact ring, with the result that the follower needle is connected to ground. The bearing cup has two opposite clearance apertures 76 through which the ends of the follower needle extend, while the upper main portion of its pivot pin 49 is rotatably mounted in the insulating body 67, allowing the needle to oscillate from side to side in apertures 76 as it rests with pivot pin in the bottom bearing 70. Upon one end of the needle body 47 of said needle is an upright bifurcated projection 77 projecting above the general level of said body in which a forwardly extending leaf spring 78 is secured. To the other end of spring 78 is secured a floating contact member 79 which has a forward contact end 85 and is formed with a clearance aperture 86 about pivot pin 49. When the needle swings to either side from the true central position shown in Figs. 8, 9, 11, and 13, the contact end 85 will come into direct contact with one of a pair of spaced contacts 87, 88 attached at one end of each to the bottom of insulating body 67 by screws or the like (Fig. 11). The latter body 67 has a plurality of spaced contact rings 80, 81 and 82 above ring 71 of bearing cup 68 with corresponding brushes similar to brush 72 with springs similar to 75 engaging said contact rings and connecting the same to distinct conductors in cable 74, the block 73 supporting the brushes being secured to frame member 53 by screws 83 (one shown). Ring 80 in the port control circuit (to be explained in connection with Fig. 13) is connected to contact 78 while ring 81 is connected to contact 79. The third ring 82 may be connected to a pair of alarm contacts 84 of an alarm device (not shown), the contacts being shown in one form in Fig. 10, when an alarm is used to warn of operation failure. In Fig. 13 which is a circuit diagram, the contact rings and brushes are ignored and conductors are instead shown connected directly to the resilient contacts, alarm contacts, follower needle, etc., but in actual practice these rings and brushes are included or their equivalents in order to allow rotation of members 66, 67 and cup 68 by means of knob 63 for effecting adjustments by the latter.

Surmounting knob 63 is a dial 93 provided with a knob 94 by which to rotate it in either direction, the latter knob as well as the dial being mounted on dial shaft 95 (Fig. 10) rotatably supported in the first mentioned larger knob 63 and provided at its lower end with a pinion 96. This pinion meshes with a larger pinion 97 which is mounted on a gear shaft 98 carrying a gear 99 meshing with a similar gear 100 on a second gear shaft 101. Both gear shafts extend down through insulating members 66, 67 and are provided at their lower extremities with the alarm contacts 84, 84, the rotation of knob 94 clockwise bringing the alarm contacts closer together and thus closer to the contact end 85 of contact member 79 associated with needle body 47, and thereby restricting its amplitude of oscillation, while rotation of said knob in the other direction separates these contacts further for greater amplitude of movement of the follower needle before end 85 of said contact member 79 makes contact with either alarm contact 84. Should the regular contacts 87, 88 be thus adjustable, either one or both of gears 99 and 100 may well be made of plastic or laminated insulating material. If desired, knob 94 may be made self-locking in normal inoperative condition and automatically released for rotation when depressed, such structures being known and perhaps superfluous to illustrate. In order to note the desired setting of the contacts, the top of knob 63 (Fig. 12) has an index mark 102 for indicating any one of the indicia 103 on dial 93.

The present system, while being substantially an automatic electrical apparatus or pilot, it is susceptible of variation so that it may include a pneumatic feature (not shown) or may be wholly electric. In the latter form, mere contact made by the follower needle will cause the apparatus to operate instantly, as will be fully explained. It is to be noted that when the follower needle 45 is centrally disposed as shown in Figs. 11, 12 and 13, or only slightly inclined to such position, the contacts 87 and 88 will not normally make contact with the contact member 85 of the needle follower.

Before considering the relay switches and the circuit as a whole, attention will be paid to the rudder operating and setting mechanism best shown in Figs. 1–7, said mechanism being driven by motor 27 through belt 30 and pulley 29, and thereby shaft 31 of the latter. This shaft is mounted in bearings 143, 144 of frame or casing 21 and carries a worm 145 meshing with a worm gear 146 mounted on a worm shaft 147 supported at one end in bearing 148 and at the other end keyed to hub 149 of tiller 26 while being mounted in bearing 150 and having a collar 151 retaining said tiller shaft in its bearing, while exteriorly of casing 21 the latter shaft has the tiller 26 keyed thereto by which to turn the shaft, when desired. The tiller may have its shaft 147 disengaged from worm gear 146 and worm 145 so that it will be free from the automatic power drive to operate the rudder at will, by pulling out clutch knob 152 and thereby withdrawing clutch member 153 from slot 154 in the hub of worm gear 146. Pushing in knob 152 will again allow member 153, which is resiliently biased to the left, to re-enter slot 154 to restore automatic control of the rudder by again connecting it with the power drive.

The worm 155 on worm shaft 147 meshes with a second worm gear 156 fast on shaft 32 mounted in bearing 157 and exteriorly carrying lever 33 or pulley 39. Above gear 156 the shaft is narrower at 158 and carries a spur gear 159 while terminating above in the bearing 160, said gear meshing with a pinion 161 fixed on a distinct shaft 162 upon which is also fixed a contact disk 163. Above this disk are mounted, first a contact arm 164 with a sleeve 165 on shaft 162 and upon the sleeve the sleeve 166 of a second contact arm 167, both arms being independently rotatable. Above dial 168 the inner sleeve 165 carries an index arm 169, and the outer sleeve 166 carries a second index arm 170, while shaft 162 is surmounted by a rudder index arm 171, the peripheral serrations 205 on dial 168 (Figs. 2 and 4) tending to retain arms 169, 170 in attained positions. This index arm or pointer is rigid on shaft 162 and thus rotates in partial rotation with the contact disk, and the pinion 161 and gear 159 are so proportioned in relative sizes that the index pointer quite accurately follows and indicates the position and movement of the rudder at all times. The movement of contact disk 163 is also adapted to follow the rudder causing it to control and terminate operation of the mechanism for shifting said rudder and allowing such action to be prearranged by setting the arms 169 and 170 to desired positions upon rudder dial 168 as will now be explained, with the relay switches of the system.

The arm 164 operated by upper dial arm 169, being of plastic, fibre or other insulating material has a sliding contact 172 capable of normally riding on the wide rim of the contact disk 163 and maintaining electrical contact therewith however the disk turns in following the movements of the rudder, until the disk turns sufficiently to register with an insulated section 173 of fibre, ebonite or any suitable plastic embedded in said rim, when the contact 172 will be insulated from the disk. The mentioned contact is connected by a lead to a switch contact 174 of a port relay switch generally indicated at 175 in Fig. 13. In similar fashion, the arm 167, also insulated and controlled by the upper dial arm 170 has a sliding contact 176 normally on the disk and connected to a contact 177 of a second or starboard relay switch generally indicated at 178.

Upon arm 164, again, is fixed a contact 179 (Figs. 5, 6 and 13) connected to compass follower contact 87, while a corresponding contact 180 is fixed on arm 167 and connected to follower contact 88. On the first arm 164 is also secured a resilient contact 181 at its outer end connected by a lead to the uppermost contact 182 of the starboard relay switch and at the inner end resilient contact 181 makes resilient contact with contact 179 on the arm. In corresponding manner, arm 167 has a resilient contact 183 secured at its outer end to the arm and connected by a lead to the uppermost contact 184 of the starboard relay switch 178, while at the inner end the resilient contact 183 makes resilient contact with contact 180 on said arm. Upon an intermediate portion of resilient contact 181 is a lifting stud 185 adapted to ride upon cam 186 on the contact disk (Figs. 5 and 7) and be raised with the inner end of member 181 out of contact with contact 179 when the disk rotates the cam under said stud. In the same manner, the stud 187 on resilient contact 183 is adapted to ride up on the cam and lift member 183 off contact 180.

The port relay switch 175 has an armature 188 adapted to be attracted by electromagnet 189, and the starboard relay switch 178 has an armature 190 independently adapted to be attracted by electromagnet 191, in each case moving contacts to open or close the same and now to be noted in detail. To armature 188 is attached a contact 192 connected to the winding 193 of the starboard relay switch and to contact 194 of starboard push button 43, the latter having a second contact 195 connected to contact 176 on rudder control arm 167 and to a contact 196 of the starboard relay switch. The push button has the main ground contact 197 for bringing contacts 194 down together on the same to cause starboard steering. Push button contact 194 is also connected to contact 198 of starboard relay switch 178. Also to armature 190 is attached the contact 199 of the starboard relay switch 178 connected to the winding 200 of the port relay switch, to one push button contact 201 of port push button 41 and to contact 202 of the port relay switch 175. The last mentioned button serves to press both contact 201 and a second contact 203 down into effective electrical contact with the ground contact 204 immediately beneath them, the second contact 203 being connected to the port relay switch contact 174 and rudder control arm contact 172 riding on contact disk 163 which is connected to ground (Fig. 13.)

In order to energize the entire circuit and its branches in the system a source of current 206 such as a grounded battery or dynamo is connected by one pole to the main switch 207 while button or switch 40 is connected to the switch coils 193 and 200 and adapted to be depressed into effective contact with said switch 207. The switch 40 is connected to both windings 193 and 200 of the starboard and port electromagnets 191 and 189, as well as to contacts 208 and 209 of both relay switches.

Turning now to the motor which serves to operate the rudder control mechanism mechanically, the four leads 210, 211, 212 and 213 form two pairs of terminals, one pair being the terminals of the motor field magnets and the other pair the terminals of the armature, the purpose of using the two pairs being to drive the motor in either direction as required for shifting the rudder to port or to starboard. The first terminal 210 is connected to the central contacts 214 and 215 at the left of the port and starboard relay switches, while the second terminal 211 is connected to the contacts 216 and 217 of said port and starboard switches. Motor terminal 212 is connected to the bottom contact 218 at the left of the port relay switch and to the bottom contact 219 at the right of the starboard relay switch. The last terminal 213 on the motor forming the second of the pair comprising 212 and 213 is connected to the lowest contact 220 at the right of the port relay switch and to the lowest contact 221 at the left of the starboard relay switch. The last pair of terminals are reversely connected to the relay switches so that when the port switch is operated the current will pass through the armature in one direction causing the armature to rotate clockwise (from the position of Fig. 13), and when the starboard switch is operated, the current will pass through the motor armature in the opposite direction and will cause counterclockwise rotation of said armature.

Noting the operation of the apparatus thus far described, it is assumed that the ship equipped therewith is in port and just leaving the pier to embark on a voyage, and it is obvious that it is but the part of wisdom to steer by manually operating the tiller 26 until the ship is sufficiently far out from port to allow a definite course for at least a part of the trip to be set. For this purpose the knob 152 is pulled out so that its key member 153 is withdrawn from slot 154 of the hub projecting on worm gear 146 to cause worm shaft 147 to rotate independently of gear 146 and its worm 145 as well as pulley 29 on worm shaft 31. Hence the tiller causes worm 155 to rotate worm gear 156 and with the latter the shaft 158. The latter is rigid with the heavier outer shaft 32 carrying rudder lever 33 and will thus transmit through link 34 and lever 35 the movements of the tiller. During such operation, the cutout switch 40 is of course open and all circuits are open as shown in Fig. 13.

When the open sea is reached by the ship, the knob 63 on the compass follower mechanism 24 (Figs. 8, 9 and 12) is manually turned to set index 65 on flange 64 thereof to a true north-south position to correspond to the position of the compass needle 46 or the like. Turning or changing the position of the knob correspondingly rotates members 66 and 67 with all appurtenances thereon which also includes the contacts 87, 88 and 84 as well as the follower needle 45, 47 and the bearings thereof, not to mention the uppermost knob 94 and its dial 93 which normally follow knob 63 in movement. Then dial 56, best seen in Fig. 12 is adjusted by rotating the same slightly in either direction, as required, by means of knob 60 in order to compensate for the variation from true north as indicated on a mariner's chart, the scale of degrees 61 on the ring dial facilitating accurate setting of said dial as well as knob 63.

The course is thereafter set, taking due note of the deviation by calculating the course, the setting of the course being accomplished by turning main knob 63 to a position in which the index 65 varies from true north by as many degrees as the course is calculated to differ from due north by checking the course on the mariner's chart. The knob 152 on the tiller having been pushed in to engage worm gear 146 with shaft 147 through entry of key 153 into slot 154 in gear 146, and switch 40 turned on, the apparatus immediately takes over the control of the rudder and the steering of the boat. The immediate effect is that the follower needle, attracted by the compass needle, in attempting to follow the latter, causes its contact member to make contact with contact 87 or 88 and closes the circuit of one of the relay switches.

Turning to a feature of said relay switches, it is to be noted that contacts 184, 199 of the starboard switch control operation of the port switch 175, while the port switch contacts 182, 192 control operation of the starboard switch 178. In other words, when the starboard switch is operated, contacts 184, 199 are separated and the port switch as a result is idle, but when the latter switch is operated, its two contacts 182, 192 are separated and consequently the starboard switch is idle as long as the port switch is active.

Assuming that the ship is sufficiently off its course, due to wind and wave, and the follower device as a whole is thus likewise sufficiently off from the north-south position or longitudinal relation with the ship to make the needle contact member engage with contact 88, closing the circuit including the follower needle, cup 68, contact 88, contact 179 on arm 164 of the rudder control mechanism, contact member 181 on the same arm, the upper left contacts 184, 199 of the starboard relay switch 178 which are normally in mutual contact in idle condition of said switch. Thus when the needle contact member makes contact with the contact member 88, the current flows from current source 206 through port switch solenoid or coil 200 and through contacts 184, 199 of the starboard switch to contacts 179, 181 of the rudder control device to said needle and contact 88, with the result that downward movement of armature 188 of the port relay switch is initiated and contacts 202 and 216 are brought together, so that current flowing through the latter effects final and full operation of the switch by drawing down said armature 188 independently of contacts 184, 199. The current from contact 174 continues up through contact 172 to contact disk 163 and thence to the frame of the apparatus or ground. In other words, from manual switch 40 current also flows from battery 206 which is grounded, through contacts 207, port switch contacts 208, 214, 218 and then proceeds down to motor terminals 210, 212. Thus when armature 188 is drawn down to separate contacts 182, 192 to isolate the starboard switch, it brings all the contacts actively together, namely, 202, 216, 174, and 220 on one side, and contacts 214, 208 and 218 together.

As the motor terminals also receive current derived from the current source 206, the armature will rotate as indicated by the curved arrows adjacent to pulley 28, so that belt 30 rotates pulley 29 and shaft 31 of the rudder control mechanism and thus drives the latter. The worm 145 rotates worm gear 146 and its shaft 147 while the worm 155 on the latter rotates worm gear 156 and shaft 32 with its narrower extension 158 upon which the spur gear 159 is mounted. Shaft 32 during movement correspondingly moves lever or arm 33 and lever 35 through link 34 as already mentioned and thereby rudder 36. The rotation of pulley 29 by the motor is reduced twice through worm and gear drive as just described, and hence, the movement of the rudder is quite slow but very powerful and thus not influenced by wind and wave.

It was just previously stated that shaft extension 158 on shaft 32 moves with worm gear 156 and gear 159 with the latter, and thus pinion 161 with its shaft 162 and rudder index 171 are moved by gear 159 which meshes with said pinion. The proportions of gear 159 and pinion 161 are selected to impart the same angular movement to the rudder follower or index 171 as arm or lever 33 imparts to the rudder. Thus, when the motor has been started, first its direction of rotation is determined by the particular electromagnetic relay switch which is operated. Operation of the port relay switch, for example, by descent of armature 188 immediately cuts out the other relay switch by opening contacts 182, 192 controlling the latter switch, but when the lower or starboard relay switch is operated, the contacts 184, 199 controlling the port relay switch are opened so as to cut out the latter, the motor then operating in the opposite direction.

However, when the motor has been started and the rudder is being shifted by the mechanism driven by said motor and contact disk 163 and rudder index 171 are following the movement of the rudder, the contact disk in rotating slowly counterclockwise while said rudder index shifts slowly to the right (starboard) will presently cause insulated block 173 on said contact disk to register with contact 176 on arm 167, thus breaking the circuit including terminals 212, 213 and stopping the motor. While the contact disk is rotating, the stud 187 on resilient contact member 183 rides up on the raised cam portion 186, raising said resilient contact member from contact 180, opening the circuit including contacts 182, 192 of the port relay switch, preventing momentary accidental operation of the starboard relay switch and any shuttling of the mechanism switches and rudder from one side to the other by sudden shifting of the follower needle 45 to make contact with resilient contact 87 and then back to contact 88, etc. It is therefore evident that the position of index arm 170 determines the extent of the movement of the rudder toward the arm as indicated by the corresponding movement of the rudder index 171.

The motor having stopped, and the proper course of the vessel having been temporarily restored, the follower needle remains, with the compass needle 46 in substantially central position longitudinally of the ship until a slight veering of the latter causes the needle 45 to be brought toward contact 87. If the shift of the vessel is now sufficient, contact end 85 of contact member 79 will close the switch circuit of the starboard relay switch coil 193 and will cause electromagnet 191 to attract armature 190. In this case the motor and the rudder control mechanism operates in the opposite direction to that in which they previously operated. The rudder is thus obviously slowly shifted with contact disk 163 and index 171 clockwise until the insulated block 173 of said disk registers with contact 172 of arm 164, stopping the motor and not only the rudder mechanism but also the rudder and rudder index in attained position, while cam 186 also lifts contact member 181 off contact 179, breaking contact with the follower. In the manner described, the needle contact member 79 will be caused to make contact with either contact 87 and 88 by the latter swinging with the ship, according to the correction for the rudder required, which operation will continue as long as the current is on.

If for any reason either one of contacts 87, 88 fails to close the circuit of one of the relay switches, or if the latter fail to work, the ship will naturally veer still farther off course than usual in one direction or the other, so that the follower needle 45 will shift past the usual effective contact positions in which its contact member first would touch contact 87 or contact 88 and will instead make contact with either one of alarm contacts 84 and cause the circuit of the alarm 222 to be closed and immediately signal a warning that the ship is off course and should be attended to. The alarm contacts 84 may be stationary or permanently set, if desired, or they may be adjustable to allow setting them variable distances apart by means of knob 94, the adjustment being capable of very accurate setting by noting the position of index 102 with respect to scale 93 and its subdivisions or markings 103.

Returning momentarily to the rudder control mechanism 25, the two index arms 169, 170 which are rigid with the contact arms 164, 167 beneath scale 168, determine by the angular space between them the latitude of shift possible to the rudder. Both index arms and their corresponding contact arms are adjustable, not only to vary the distance between them, but also individually to counteract side draft, wind or one-sided action of the sea.

In stormy weather it is obviously advisable to space the contacts 87, 88 further apart by means of knob 94 than in mild weather to avoid ceaseless starting and stopping of the motor, as stormy seas tend to swing or rock the ship and cause the compass needle and thus also the follower needle 45 (Figs. 13 and 14) to swing from side to side. A certain leeway is therefore necessary without causing operation of the rudder control mechanism, short of actual departure from the course.

It has already been mentioned that contact member 79 has a forward contact end 85 and is provided with a clearance aperture 86 about the pivot pin by which it will avoid contact with the latter. The contact portion 231 is adapted to make resilient contact with either stationary or adjustable contacts 87, 88 because the contact member is resiliently suspended upon the spring 78, and hence, proper contact will occur between the contact members without jarring or damaging needle 45 or its pivot pin 49 nor its point 89. In service the follower needle thus makes direct contact by end 85 with one or the other of the contacts 87, 88 and thereby causes operation of the circuits of the two relay switches. Of course, the needle body 47 could itself be provided with lugs rigid therewith adapted to engage individually with contacts 87, 88, if desired, this sort of modification being immediately obvious upon mere mention thereof, and hence, superfluous to illustrate per se.

Figures 2, 3, 4, 5, 6:
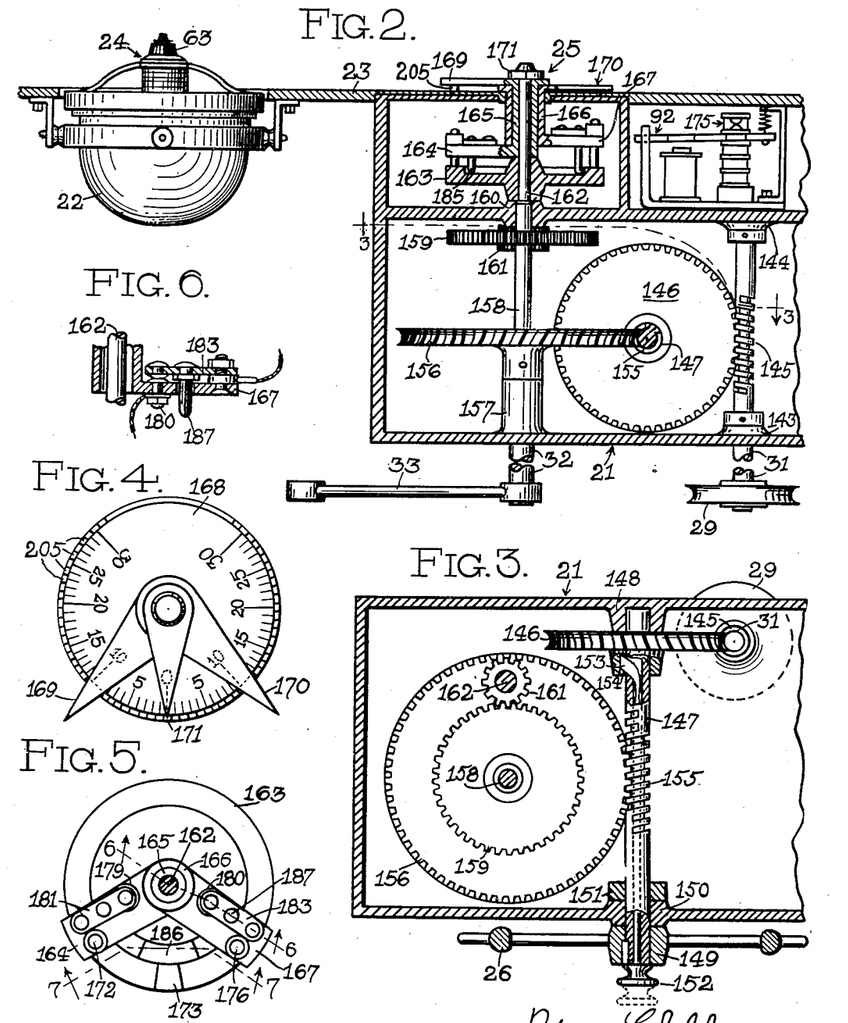
Fig. 2 is a plan view of the same apparatus as seen from the top with the top removed and parts in section to disclose relations between the parts and details.
Fig. 3 is a transverse section of the apparatus taken on line 3—3 of Fig. 2.
Fig. 4 is a plan view of the dial and the two side limit indicators as well as the rudder indicator of the rudder control mechanism forming an essential portion of the apparatus.
Fig. 5 is a plan view of the parts immediately beneath the dial of Fig. 4, certain parts being in section.
Fig. 6 is a fragmentary section of a rotary arm taken on line 6—6 of Fig. 5.
Figure 7:
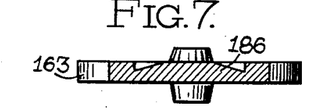
Fig. 7 is a section of the disk member of Fig. 6 as taken on line 7—7 in the latter.
Figure 8:
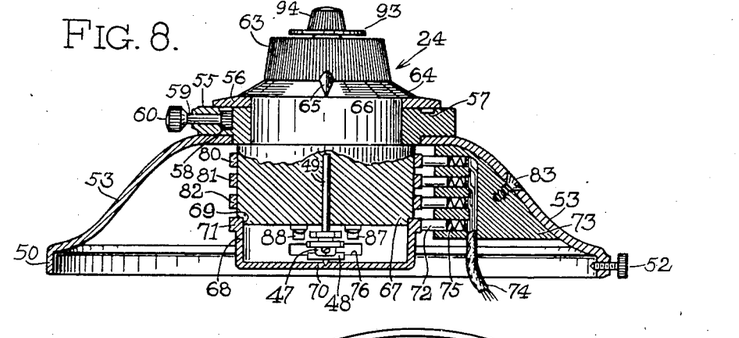
Fig. 8 is a vertical section of the major portion of a compass follower mechanism also forming part of the apparatus.

On the other hand, it may be desirable to operate the ship without the compass follower device and yet electrically, and for such operation the two operating buttons 41 and 43 are provided (Figs. 1 and 13), button 41 causing the port relay switch to act and set the rudder control mechanism in operation to steer to port, while depressing button 43 causes the starboard relay switch to act and set the rudder control mechanism in operation to shift the rudder to steer starboard, or depressing button 42 for steering a straight course, as the case may be. The two index arms 169, 170 are then swung out to the sides, if desired, or they may be located as shown in Figs. 1, 5 or 13 to allow a fairly wide latitude of movement of the rudder whenever its control mechanism has been set going in either direction. When it is desired to change the direction or simply to stop the rudder control mechanism, a stop button 42 (Fig. 1) may be provided for convenience to cancel operation by either of the port or starboard switches and then allow effective operation of the opposite switch from that just stopped, and vice versa.

As suggested, for example in Fig. 15, the canceller button 42 has a wide bottom flange or extension 233 resting on a lever 234 pivoted at 235 on a support 236 secured to plate 237 through which all three buttons project. At the extremities lever 234 is connected to the port and starboard buttons 41 and 43 by pins 238 and 239 projecting through slots 240 and 241 in the lever, with the result that when button 41 is depressed, the lever is inclined downward at the end associated therewith, effectively preventing button 43 from simultaneously occupying or even momentarily assuming a depressed position, and vice versa, as shown in said Fig. 15. In other words, only one end button at the time may be depressed with consequent operation of the rudder operating or correcting mechanism. The steering then being controlled at will by pushing buttons 21 and 43 alternately, it may be termed push button steering.

When the canceller button 42 is depressed, the wide lower portion 233 thereof tends to rock lever 234 from inclined position into parallelism with plate 237 or into horizontal position, in which position both operating buttons 41 and 43 are sufficiently raised to free contacts 194, 195 from stationary contact 197 and contacts 201 and 203 from stationary contact 204, stopping operation of the rudder correcting mechanism. When all three buttons 41, 42 and 43 are thus neutral, the automatic control or compass follower device 24 takes over the control of the operation and correction of the rudder and its position in accordance with the setting of said device for following a definite course.

The button arrangement just described is only partly shown in the circuit diagram of Fig. 13, as far as will serve for said diagram in order to clarify the drawings, and as the arrangement actually shown may be varied mechanically and even substituted by electrical means with reference to button 42 and lever 234 controlling the mutual relations between buttons 41 and 43, the details shown in Fig. 15 merely suggest such operating features. The push button steering obviously occurs independently of the follower or automatic control device and of the tiller as well.

It is quite evident that the compass follower needle which is a movable contact member may either co-operate with a magnetic compass or be attached to the disk of a gyro-compass, or itself be magnetized so as to be direction responsive independently of other devices to the terrestrial poles.

From the foregoing it is clear that the invention makes it not only possible but actually convenient to quickly set the apparatus for meeting various conditions of wind and weather and wave, to provide quite automatic steering of a ship along a given straight course, to make very abrupt turns at substantially right angles to a previous course, and to steer the ship generally without the attention of a human eye or hand, and to limit the extent of the corrections applied to the rudder by the operating mechanism to suit the conditions of the open sea as well as the judgement of the navigator. It is likewise obvious that symmetrical adjustment of the rudder control mechanism is possible to compensate for wind, side draft, side shift or propeller drag, and that the exact position, angle and even movements of the rudder with respect to the longitudinal axis of the ship will always be in evidence.

In addition to the above, it is to be noted that at all times the adjustments for setting the course, for correcting deviation, and compensating for various conditions encountered in harbors or at sea are all conveniently and accurately made right down to scale subdivisions so that records may be made and such settings later duplicated. Due to the comprehensive control of the steering afforded by the apparatus embodying the invention, steering may even be performed by using the main knob 63 of the compass follower or control unit and turning said knob without regard to the tiller while watching the ship's compass and if near shore, channel markings and any other outside indications of the proper course for the ship until the harbor shallows have been left behind.

Manifestly, modifications of many features of my invention and its details may be resorted to and parts used without others, within the scope of said invention, the drawings merely illustrating non-limiting examples of apparatus for carrying out said invention.

Having now fully described my invention, I claim:

1. An automatic pilot for ships and other craft, including a movable contact member responsive to the magnetic poles, two spaced contacts stationary upon said craft adapted to be engaged individually by said movable contact member in displaced positions of said craft, and electric correcting mechanism for the rudder including operating mechanism for shifting said rudder when one of the stationary contacts is engaged by the movable contact member in order to restore the craft to a predetermined course, and two groups of electric switches connected to said operating mechanism and individually associated electrically with the two spaced contacts, and a pair of contacts in each group controlling the other group when the group is operated with which the pair is associated, and means for determining the extent of the shifting of the rudder including two independently adjustable contact arms, a movable contact member moving with the rudder by means of the operating mechanism and having circuit breaking means thereon, two independent contact means on each arm, each controlling a circuit including one of said two groups of switches and individually capable of engaging with one of the circuit breaking means on said movable contact member to open the circuit thereof when the movable contact member is moved with the rudder to effective position for such engagement, and a source of electric current for said switches, contact means and electric correcting mechanism.

2. An automatic electric pilot for ships and other craft, comprising a movable contact member, means causing the contact member to be responsive to displacement of the craft from a predetermined course, electrical mechanism having a rudder shiftable in opposite directions thereby, two contacts spaced apart upon the craft in proximity to the movable contact member, a current source, means for determining the extent of shifting in either direction to be imparted to the rudder by said mechanism including a movable contact member connected to the mechanism and moved thereby in correspondence to the movement of the rudder, two manually adjustable arms movable adjacent to said last mentioned movable contact member, an insulated section upon a portion of the latter adapted to be moved to either arm, a plurality of circuit breakers on each arm, one circuit breaker on each being capable of breaking an operating circuit of said mechanism upon movement of a predetermined portion of the last mentioned movable contact member toward the circuit breaker involved, another circuit breaker on each arm including a contact thereon adapted to rest against said last mentioned movable contact member and in one position of the latter with respect to each arm present the insulated portion or section to said last named contact on the arm, and means for indicating the position and movements of said last movable contact member with respect to said two adjustable arms.

3. An automatic pilot for ships and other craft, including a support means, two spaced contacts on said support means, a movable contact member pivotally mounted in association with the support means, two relay switches each having an electromagnetic device and an armature core, a pair of switch control contacts associated with each relay switch being separable by operation of the armature of the respective switch involved and having one contact of the pair of control contacts connected to one lead of the electromagnetic device of the other switch, the other contacts of both pairs being individually connected to said two spaced contacts, a series of further contacts associated with each of the two switches capable of being closed in predetermined groups by the armature of the respective switch with which they are associated, one of each of the series of the further contacts also being connected to said one lead of the electromagnetic device in each switch, an electric motor having a plurality of motor leads for conducting electric current thereto, another of the contacts in each series being connected in common to one of the motor leads, a further contact in each series being connected in common to a second of the motor leads, a fourth contact in the one series being connected to a third motor lead and a corresponding fourth contact in the other series being connected to a fourth motor lead, a fifth contact of said one series also being connected to the fourth motor lead, and a corresponding fifth contact of the other series being connected to the third motor lead, a current source connected in common to both electromagnetic devices and to a sixth contact in each series, a return connection from said movable contact member to the current source, and a return connection from a seventh contact in each series to said current source, and means for breaking the connection alternatively between the seventh contact in either series and said current source to limit the operation of said motor in either direction.

4. An automatic pilot for ships and other craft, including a support means mounted upon the ship, two spaced contacts upon said support means, a shifting contact member movably mounted in proximity to said spaced contacts and capable of making contact alternatively with the latter in displaced positions of said ship with respect to a predetermined course, two relay switches each having an electromagnetic device with conductors thereto for electric current and a movable armature or core associated with the device, a pair of switch control contacts associated with each relay switch being separable by operation of the armature of the switch involved and having one contact of the pair connected to one lead of the electromagnetic device of the other switch, the other contacts of both pairs being individually connected to said two spaced contacts, two groups of further contacts associated with each relay switch being closed upon operation of the armature of the latter and having one contact of one group of each switch also connected to said one lead of the electromagnetic device of the respective switch involved, an electric motor having a plurality of terminals for conducting electric current thereto, one contact in the other group of each switch being connected in common to one of said motor terminals, a second contact in the other group of one switch being connected to another terminal and the corresponding contact in the other group of the other switch being connected to a further terminal of the motor, a further contact of said other group in both switches being connected in common to the other lead of the electromagnetic devices of both switches and to a common source of current, a second contact of said one group of one switch being connected to the other terminal of the motor and the corresponding contact in the said one group of the other switch being connected to said further terminal, a third contact in the mentioned one group of both switches being connected in common to a fourth terminal of said motor, a return connection from said shiftable contact member to said current source, a return connection from a fourth contact in the one group of both switches, and means for breaking the connection between either of the fourth contacts of the last mentioned groups and the current source to limit the operation of said motor in either direction of rotation.

5. An automatic electric pilot for ships and other craft, including a rudder and an electric correction mechanism for shifting said rudder for restoring the craft to a predetermined course when the latter is displaced from said course, means subject to the influence of the magnetic poles capable of initiating operation of the electric correcting mechanism when the craft is off course, and means for determining the extent of the shifting of the rudder to either side, including a movable contact member moving in correspondence with the rudder and having an insulated portion thereon, an index member moving with said contact member to indicate visually the position and movements of the rudder at all times, a pair of contact arms mounted for individual movement adjacent to said contact member and making contact therewith and individually capable of coming into contact with the insulated portion thereof, said contact arms being associated with electrical circuits in the electric correcting mechanism for controlling the latter and limiting operation thereof, and manually adjustable index members individually associated rigidly with each of said two contact arms to visually indicate the positions of said arms and disposed at both sides of the index member of the contact member and rudder to indicate the latitude of movement allowed the latter according to various adjustments of said contact arms.

6. An automatic pilot for ships and other craft, including a movable contact member responsive to the influence of the magnetic poles, two spaced contacts stationary upon said craft adapted to be engaged individualy by said movable contact member in displaced positions of said craft, and electric correcting mechanism for the rudder including operating mechanism for shifting said rudder when one of the stationary contacts is engaged by the movable contact member in order to restore the craft to a predetermined course, two groups of electric switches connected to said operating mechanism and individually associated electrically with the two spaced contacts, a pair of contacts in each group controlling the other group when the group is operated with which the pair is associated, and means for determining the extent of the shifting of the rudder to both sides, including two independently adjustable contact arms, a movable contact member moving with the rudder by means of the operating mechanism and having circuit breaking means thereon, an independent contact means on each arm, each controlling a circuit including one of said two groups of switches and individually capable of engaging with the circuit breaking means on said movable contact member to open the circuit thereof when the movable contact member is moved with the rudder to effective position for such engagement, and means for feeding electric current from an appropriate source to said switches, contact means and electric correcting mechanism.

7. An automatic electric pilot for ships and other craft, including a movable contact member responsive to the influence of the magnetic poles, two spaced contacts stationary upon said craft adapted to be engaged individually by said movable contact member in displaced positions of the craft, and electric correcting mechanism for the rudder including operating mechanism for shifting said rudder when one of the stationary contacts is engaged by said movable contact member in order to restore said craft to a predetermined course, two groups of electric switches connected to said operating mechanism and individually associated electrically with the two spaced contacts, a pair of contacts in each group of switches controlling the other group when the group is operated with which the pair of contacts is associated, and means for determining the extent of the shifting of the rudder to both sides, including two independently manually adjustable contact arms, means associated individually with each of said arms for indicating the movements and positions of said arms at all times, a movable control member moving with the rudder by means of the operating mechanism and having a circuit breaking means thereon, contact means on each arm individually controlling a circuit including one of said two groups of switches and capable of engaging with the circuit breaking means on said movable control member to open the respectively associated circuit of the contact means engaged when the rudder and the control member are moved to effective position for such engagement, and an index member moving between the indicating means of the arms in accordance with the movements of the rudder and control member for indicating the movements and position of the rudder with respect to said arms.

8. A pilot according to claim 7, in which the two spaced contacts are adjustable to vary the distance between them and thus vary the permissible movement of the movable contact member.

9. An automatic electric pilot for ships and other craft, including an electric control unit for determining the course of the craft, a rudder and an associated electrical correcting mechanism for shifting the rudder and thereby restoring the craft to its course when said mechanism is caused to operate by said control unit upon displacement of the craft from said course, and a distinct rudder control unit for limiting the shifting of the rudder by the correcting mechanism to both sides, including a scale having a movable index moving with the rudder to indicate its movements and position at all times with respect to said scale, a pair of individually adjustable arms capable of stopping the operation of the correcting mechanism during shifting of said rudder when the latter has been shifted to an extent approaching the position of one of said arms, and index members individualy associated with said arms and moving therewith when said arms are adjusted for varying the latitude of shifting of the rudder, said index members being disposed in proximity to said dial at the two sides of the index member of the rudder, electrical circuits in said correcting mechanism controlled by said arms, and means for supplying electric current to said pilot for operation thereof.

UNO EKBLOM.

REFERENCES CITED

The following references are of record in the file of this patent:

UNITED STATES PATENTS

| Number | Name | Date |
|---|---|---|
| 1,939,775 | Holmes | Dec. 19, 1933 |
| 1,958,428 | Harman | May 15, 1934 |
| 1,993,548 | Holmes | Mar. 5, 1935 |
| 1,993,549 | Holmes | Mar. 5, 1935 |
| 1,993,550 | Holmes | Mar. 5, 1935 |
| 1,993,551 | Holmes | Mar. 5, 1935 |
| 2,032,018 | Holmes | Feb. 25, 1936 |